(12) United States Patent
Jo

(10) Patent No.: US 11,841,583 B2
(45) Date of Patent: Dec. 12, 2023

(54) ULTRA-SLIM BACKLIGHT UNIT

(71) Applicant: LUMENS CO., LTD., Yongin-si (KR)

(72) Inventor: Sung Sik Jo, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 0 days.

(21) Appl. No.: 17/892,343

(22) Filed: Aug. 22, 2022

(65) Prior Publication Data

US 2023/0062155 A1    Mar. 2, 2023

(30) Foreign Application Priority Data

Aug. 27, 2021 (KR) .................... 10-2021-0114113

(51) Int. Cl.
*G02F 1/1335* (2006.01)
*G02F 1/13357* (2006.01)
*F21V 8/00* (2006.01)

(52) U.S. Cl.
CPC ..... *G02F 1/133607* (2021.01); *G02B 6/0036* (2013.01); *G02F 1/133603* (2013.01); *G02F 1/133611* (2013.01); *G02F 1/133614* (2021.01)

(58) Field of Classification Search
CPC ......... G02F 1/133603; G02F 1/133607; G02F 1/133608; G02F 1/133611; G02B 6/005; G02B 6/0051; G02B 6/0053; G02B 6/0036; G02B 6/0068; G02B 6/0073
See application file for complete search history.

(56) References Cited

U.S. PATENT DOCUMENTS

| | | | |
|---|---|---|---|
| 11,508,881 B2* | 11/2022 | Imada | H01L 33/36 |
| 2007/0121340 A1* | 5/2007 | Hoshi | G02B 6/0021 |
| | | | 362/600 |
| 2008/0186273 A1* | 8/2008 | Krijn | G02B 6/0038 |
| | | | 362/231 |
| 2009/0323329 A1* | 12/2009 | Lin | G02B 6/0036 |
| | | | 362/311.06 |
| 2020/0064538 A1* | 2/2020 | Chen | G02B 6/0036 |
| 2021/0055607 A1* | 2/2021 | Lee | G02F 1/133605 |
| 2021/0165277 A1* | 6/2021 | Park | G02F 1/133606 |
| 2021/0191003 A1* | 6/2021 | Pham | G02B 5/0205 |

* cited by examiner

*Primary Examiner* — Erin Kryukova
(74) *Attorney, Agent, or Firm* — Mei & Mark LLP

(57) ABSTRACT

Provided is a backlight unit including: a substrate; a plurality of light-emitting devices mounted on the substrate; and an optical sheet disposed above the light-emitting devices, wherein the optical sheet is in contact with a light-emitting surface of at least one light-emitting device via one surface thereof, and emits light of the light-emitting device incident on one surface thereof to the other surface facing the one surface, while refracting or dispersing the light in a direction different from a direction in which the light is incident due to an optical pattern formed therein.

18 Claims, 8 Drawing Sheets

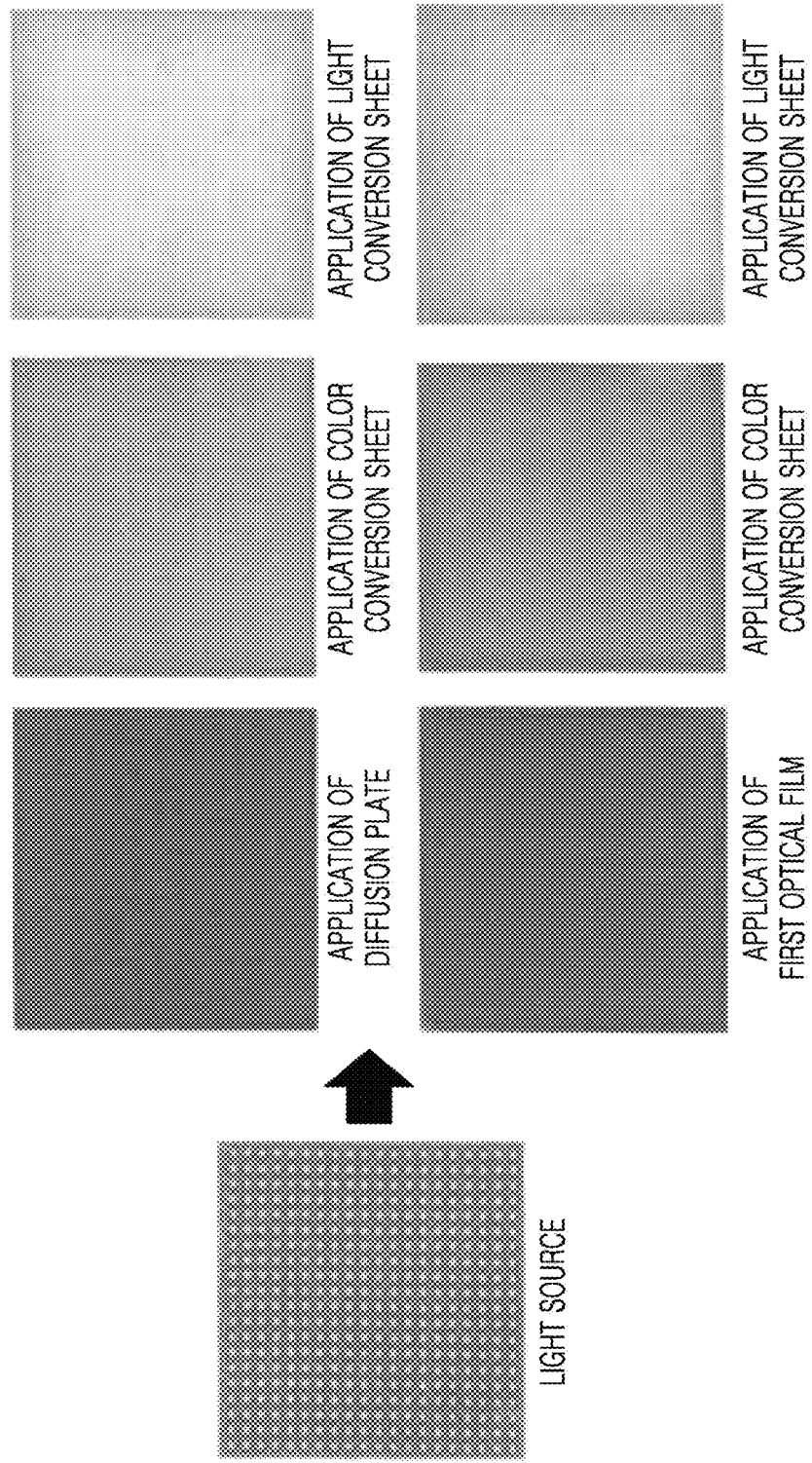

ULTRA-SLIM BACKLIGHT UNIT

CROSS-REFERENCE TO RELATED APPLICATION

This application is based on and claims priority under 35 U.S.C. § 119 to Korean Patent Application No. 10-2021-0114113, filed on Aug. 27, 2021, in the Korean Intellectual Property Office, the disclosure of which is incorporated by reference herein in its entirety.

BACKGROUND

1. Field

One or more embodiments of the disclosure relate to an ultra-slim backlight unit.

2. Description of the Related Art

A light-emitting diode (LED) denotes a kind of semiconductor device capable of realizing various colors of light by forming a light source through a PN diode formation of a compound semiconductor. A light-emitting device has advantages of long lifespan, small size and light-weight, and low voltage driving. In addition, an LED is resistant to shock and vibration and does not need pre-heating time and complicated driving. In addition, the LED may be mounted on a substrate or a lead frame in various forms and packaged, and thus, may be modularized for various purposes and applied to a backlight unit or various illumination devices.

In addition, a backlight unit may be classified as an edge-type and a direct-type according to light source arrangement and light transfer type. According to a direct-type backlight unit, a light source such as an LED is arranged on a rear surface of a display apparatus so that light emitted from the light source is directly provided to a display panel, and thus, a high optical efficiency may be obtained.

A light source device used in a direct-type backlight unit may include an LED, and a substrate on which the LED is mounted and which includes a circuit device for driving the LED, etc. In addition, because the LED that is a point light source is used as a light source, optical uniformity degrades, and thus, various kinds of diffusion members for improving the optical uniformity may be included. For example, an optical lens and a diffusion plate for diffusing the light emitted from the light-emitting device into the light of even luminance may be included, and a sufficient optical distance for diffusing light has to be considered.

The direct-type backlight unit of the related art has to include the optical lens and the diffusion plate for light diffusion and has to secure a sufficient optical distance between the light source and the diffusion plate, and thus, it is difficult to reduce a thickness thereof to a certain level or less. Also, because the optical lens and a plurality of optical sheets are included, there is a limitation in implementing a display having flexibility.

SUMMARY

One or more embodiments of the present disclosure provide a backlight unit capable of implementing a surface light source that satisfies high luminance and color uniformity even when a diffusion plate and an optical lens are removed from a direct-type backlight unit.

Additional aspects will be set forth in part in the description which follows and, in part, will be apparent from the description, or may be learned by practice of the presented embodiments of the disclosure.

According to an embodiment of the present disclosure, provided is a backlight unit including a substrate, a plurality of light-emitting devices mounted on the substrate, and an optical sheet disposed above the light-emitting devices, wherein the optical sheet is in contact with a light-emitting surface of at least one light-emitting device via one surface thereof, and emits light of the light-emitting device incident on one surface thereof to the other surface facing the one surface, while refracting or dispersing the light in a direction different from a direction in which the light is incident due to an optical pattern formed therein.

The optical sheet may have the optical pattern formed between the one surface and the other surface thereof so that an exit angle of the light emitted through the other side is greater than an incident angle of the light incident on the one surface.

A distance between an upper surface of the substrate and a part of the one surface of the optical sheet, which is not in contact with the light-emitting surface of the light-emitting device, may be at most 1.5 times a height of the light-emitting device.

The backlight unit may further include a color conversion sheet that is in contact with the other surface of the optical sheet, and a light conversion sheet that is in contact with the color conversion sheet.

The backlight unit may further include a fixing unit for fixing the optical sheet to an upper portion of the substrate.

The optical pattern formed in the optical sheet may have a repeated pattern structure so as to refract and disperse the light incident on one surface of the optical sheet.

The pattern structure may include one of a hexagonal shape, a conical shape, a pyramid shape, a trapezoidal shape, and an embossed shape.

The pattern structure may include a nano-lens pattern.

The optical sheet may include a first optical sheet and a second optical sheet disposed on the first optical sheet, and the first optical sheet and the second optical sheet may each include an optical pattern formed therein.

The optical pattern of the first optical sheet and the optical pattern of the second optical sheet may be arranged so as not to overlap each other.

According to another embodiment of the present disclosure, provided is a backlight unit including a substrate, a plurality of light-emitting devices mounted on the substrate, and an optical sheet disposed above the light-emitting devices, wherein the light-emitting devices are disposed on the substrate to be spaced apart from one another, and one surface of the optical sheet is at least partially in contact with a light-emitting surface of an outermost light-emitting device, from among the plurality of light-emitting devices, and the optical sheet emits light from the light-emitting device incident on one surface to the other surface facing the one surface while refracting or dispersing the light in a direction different from an incident direction due to the optical pattern formed therein.

The optical sheet may have the optical pattern formed between the one surface and the other surface thereof so that an exit angle of the light emitted through the other side is greater than an incident angle of the light incident on the one surface.

A distance between an upper surface of the substrate and a part of the one surface of the optical sheet, which is not in contact with the light-emitting surface of the light-emitting device, may be at most 1.5 times a height of the light-emitting device.

The backlight unit may further include a color conversion sheet that is in contact with the other surface of the optical sheet, and a light conversion sheet that is in contact with the color conversion sheet.

The backlight unit may further include a fixing unit for fixing the optical sheet to an upper portion of the substrate.

The optical pattern formed in the optical sheet may have a repeated pattern structure so as to refract and disperse the light incident on one surface of the optical sheet.

The pattern structure may include one of a hexagonal shape, a conical shape, a pyramid shape, a trapezoidal shape, and an embossed shape.

The pattern structure may include a nano-lens pattern.

The optical sheet may include a first optical sheet and a second optical sheet disposed on the first optical sheet, and the first optical sheet and the second optical sheet may each include an optical pattern formed therein.

The optical pattern of the first optical sheet and the optical pattern of the second optical sheet may be arranged so as not to overlap each other.

Other aspects, features and advantages other than those described above will become apparent from the following detailed description of the drawings, claims and disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram showing results of performance tests for a backlight unit according to an embodiment of the present disclosure and a backlight unit according to the related art.

DETAILED DESCRIPTION

Figure 1:
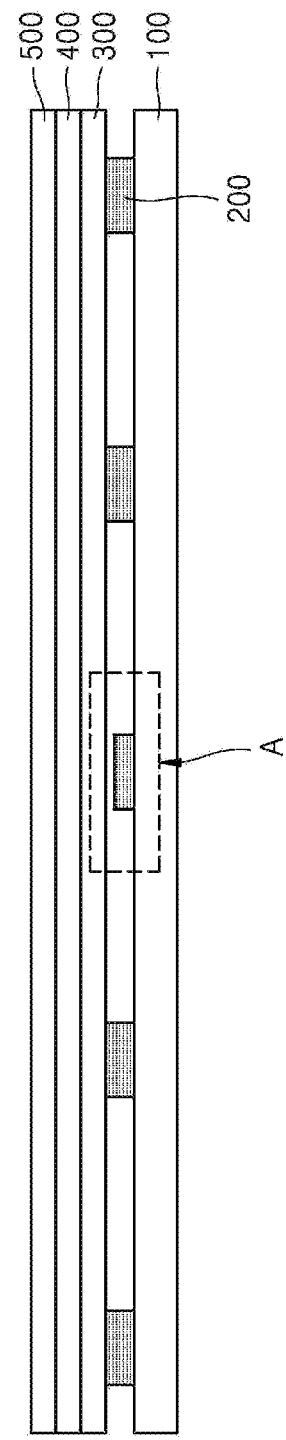
FIG. 1 is a cross-sectional view schematically showing a backlight unit according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The exemplary embodiments will be described below in more detail with reference to the accompanying drawings. Those components that are the same or are in correspondence are rendered the same reference numeral regardless of the figure number, and redundant explanations are omitted.

As the present disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including," "having," and "comprising" are intended to indicate the existence of the features or components disclosed in the specification, and are not intended to preclude the possibility that one or more other features or components may exist or may be added.

It will be understood that when a unit, region, or component is referred to as being "formed on" another layer, region, or component, it can be directly or indirectly formed on the other layer, region, or component. That is, for example, intervening units, regions, or components may be present.

It will be understood that when an element is referred to as being "connected" or "coupled" to another element, it can be directly connected or coupled to the other element or intervening elements may be present.

Sizes of components in the drawings may be exaggerated for convenience of explanation. In other words, since sizes and thicknesses of components in the drawings are arbitrarily illustrated for convenience of explanation, the following embodiments are not limited thereto.

Figure 2:
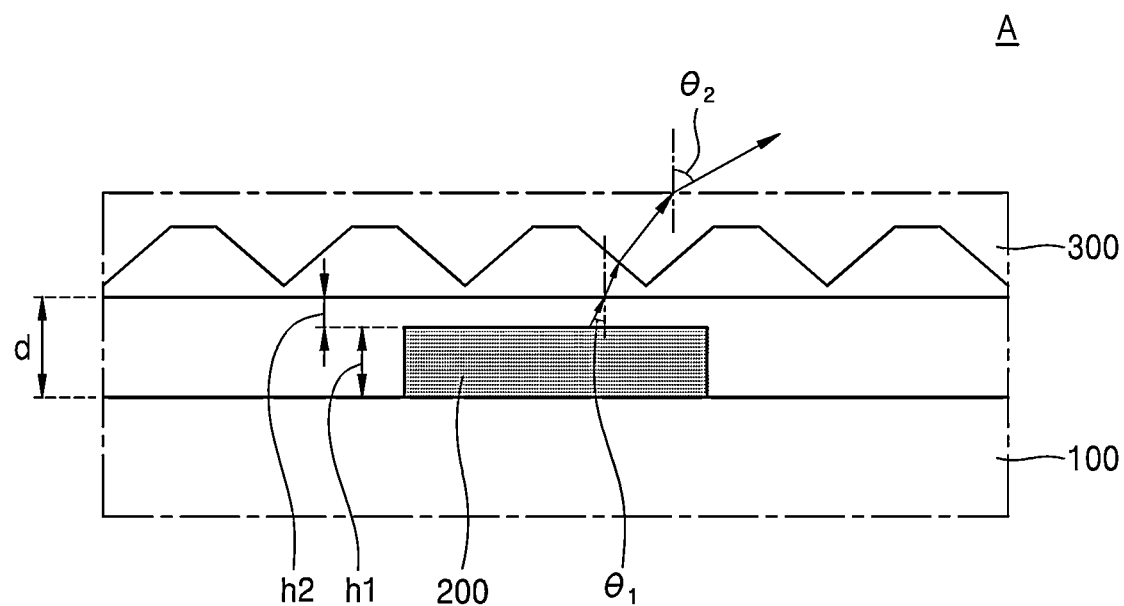
FIG. 2 is a cross-sectional view showing an enlarged view of region A in FIG. 1.
Figure 3A:
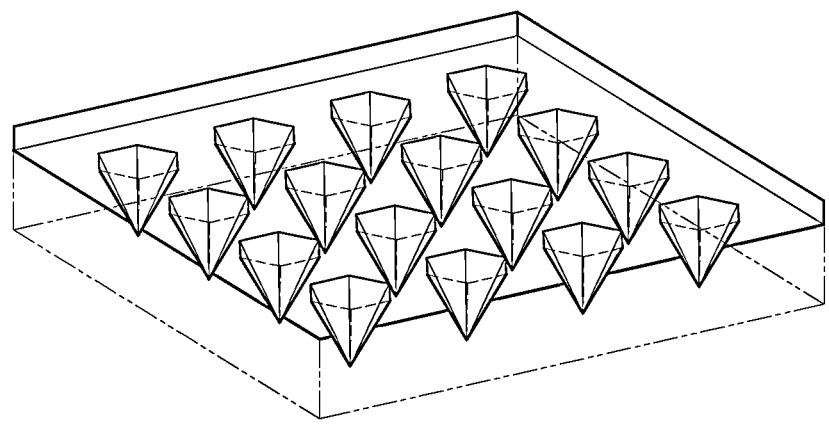
FIG. 3A is a perspective view of an optical sheet according to an embodiment of the present disclosure.
Figure 3B:
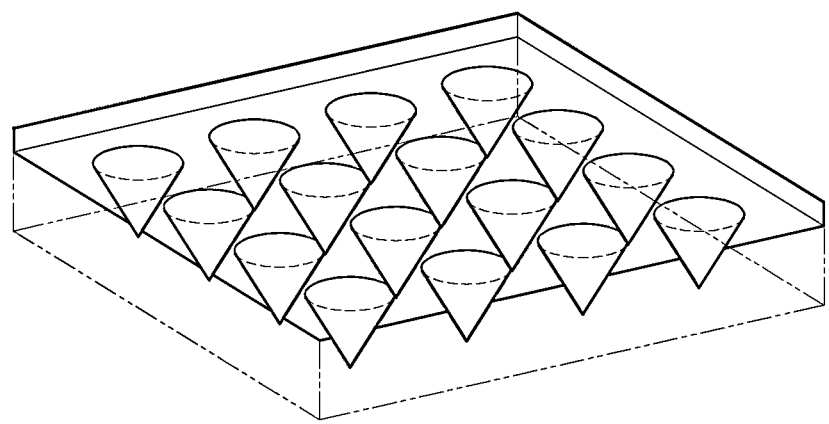
FIG. 3B is a perspective view of an optical sheet according to an embodiment of the present disclosure.
Figure 3C:
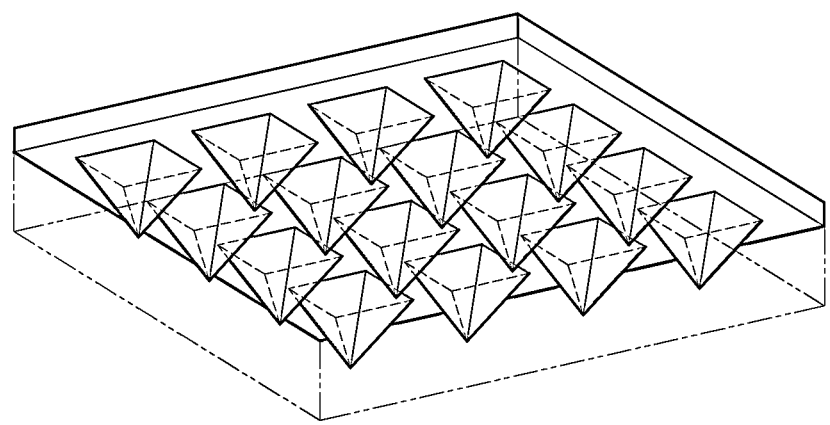
FIG. 3C is a perspective view of an optical sheet according to an embodiment of the present disclosure.

FIG. 1 is a cross-sectional view schematically showing a backlight unit according to an embodiment of the present disclosure, FIG. 2 is a cross-sectional view showing an enlarged view of region A in FIG. 1, and FIGS. 3A, 3B, and 3C are perspective views of an optical sheet 300 according to an embodiment of the present disclosure.

Referring to FIGS. 1 to 3C, the backlight unit according to an embodiment of the present disclosure may include a substrate 100, a plurality of light-emitting devices 200 mounted on the substrate, and the optical sheet 300 disposed on the light-emitting devices. Also, the backlight unit according to an embodiment of the present disclosure may further include a color conversion sheet 400 and a light conversion sheet 500 disposed on the optical sheet 300.

The substrate 100 of the backlight unit is electrically connected to the light-emitting device 200 and relays an electrical signal transfer between the light-emitting device 200 and a circuit board. A circuit device and an electrode may be provided on one surface of the substrate 100. The substrate 100 may include a printed circuit board (PCB) on which a wiring layer is formed, or a flexible PCB (FPCB) formed of a flexible material.

Also, the substrate 100 may be formed of a material having an appropriate mechanical strength and insulating property or a conductive material so that the plurality of light-emitting devices 200 may be mounted and supported thereon. For example, the substrate may include a substrate including a synthetic resin such as a resin, glass epoxy, etc., a ceramic substrate in consideration of a thermal conductivity, or a metal substrate formed of insulated aluminum, copper, zinc, tin, lead, gold, silver, etc., and may be provided in a plate shape or a lead frame shape. Also, the substrate 100 may be formed in a square or rectangular thin film shape, but is not limited thereto, that is, the substrate 100 may be formed in various shapes.

The substrate 100 supports the light-emitting devices 200 and may reflect the light emitted from the light-emitting devices 200. Accordingly, the light emitted from the light-emitting devices 200 may be reflected by an upper surface of the substrate 100 and then may be discharged to an upper direction of the backlight unit.

The light-emitting devices 200 may be disposed on the substrate 100 and may emit light upward. The light-emitting device 200 may emit light through one surface, and the surface through which the light is emitted may be defined as a light-emitting surface. The light-emitting device 200 may emit light by receiving an electrical signal from the circuit board.

The light-emitting device 200 mounted on the substrate 100 may be a flip-chip type light-emitting device, but is not limited thereto. The light-emitting device 200 may include various types of light-emitting devices including horizontal or vertical type LED, or a light-emitting device on which a signal transfer medium such as various bump, wire, solder, etc. is installed.

The light-emitting device 200 may emit light of different wavelengths according to a composition ratio of a compound semiconductor. For example, the light-emitting device 200 may include a blue LED emitting blue light, but is not limited thereto. That is, the light-emitting device 200 may include one of a red LED and a green LED, or may include an LED or an ultraviolet LED emitting light of various wavelengths.

The LED may be classified as a large-sized LED (chip size: 1000 μm or greater), an intermediate-sized LED (chip size: 300 to 500 μm), a small-sized LED (chip size: 200-300 μm), a mini-sized LED (chip size: 100 to 200 μm), and a micro-LED (chip size: 100 μm or less) according to a size of an LED chip. As the LED chip size of the backlight unit decreases, the number of LEDs may be easily adjusted, and a luminance characteristic and a color uniformity of the backlight unit may be improved. Also, as the LED chip size decreases, a thickness of the backlight unit is reduced to make the backlight unit slim. In addition, power consumption may be reduced, and thus, a battery lifespan may be increased and performance of the backlight unit in a portable device may be improved. For example, when the mini-sized LED or the micro-LED is used, a local dimming may be performed because the LED has reduced size. Through the local dimming, the image quality of the display apparatus may be improved and power may be effectively used.

The plurality of light-emitting devices 200 may be disposed on the substrate 100 in a checkerboard type and may be formed in direct-type. The number of light-emitting devices 200 mounted on the substrate 100 may vary. Also, the plurality of light-emitting devices 200 may be arranged at certain intervals therebetween, but are not limited thereto. That is, the plurality of light-emitting devices 200 may be mounted on a plane of the substrate 100 in various shapes.

The light emitted from the plurality of light-emitting devices 200 may be diffused through the optical sheet 300 that will be described later and may be output to outside with uniform intensity.

In addition, the optical sheet 300 may be in contact with a light-emitting surface of at least one light-emitting device 200 via one surface thereof, and emits the light of the light-emitting device 200 incident on one surface to the other surface facing the above one surface, while refracting or dispersing the light in a direction different from a direction in which the light is incident due to an optical pattern formed therein.

The optical sheet 300 may be disposed above the light-emitting device 200, and may emit the light that is incident on one surface thereof through the other surface after refracting or dispersing the light through the optical pattern formed therein. One surface of the optical sheet 300 is adjacent to the light-emitting surface of the light-emitting device 200 and is a surface in which the light emitted from the light-emitting device 200 may be incident. The other surface of the optical sheet 300 faces the above one surface, and the light incident on the optical sheet 300 passes through the optical sheet 300 and may be emitted through the other surface.

The optical sheet 300 may be implemented as a film type of a transparent material, but is not limited thereto. The optical sheet 300 is thin and generally transparent, and mostly transmits the light incident on one surface thereof and emits the light through the other surface. Thus, an optical transparency is increased and optical efficiency is also improved.

The optical sheet 300 may include a resin that may diffuse the light. For example, the optical sheet may include polyimide (PI), polyethylene terephthalate (PET), polyethylene naphthalate (PEN), or polycarbonate (PC) having flexibility, but is not limited thereto.

The optical sheet 300 diffuses the light and may refract or disperse the light incident on one surface thereof due to the optical pattern formed therein.

FIG. 2 is a cross-sectional view showing an example in which the optical sheet 300 has the optical pattern of a conical shape formed therein. The light emitted from the light-emitting device 200 is incident in one surface of the optical sheet 300 disposed above the light-emitting surface of the light-emitting device 200, and the incident light is reflected, refracted, or dispersed due to the optical pattern formed in the optical sheet 300 and the reflected, refracted, or dispersed light is emitted through the other surface facing the above incident surface.

When an incident angle of the light incident on one surface of the optical sheet 300 is $\theta_1$ and an exit angle of the light emitted through the other surface of the optical sheet 300 is $\theta_2$, the backlight unit according to an embodiment of the present disclosure may arrange the optical sheet 300 so that a condition of $\theta_1 < \theta_2$ is satisfied. The exit angle of the light emitted through the other surface is determined according to the incident angle of the light incident on one surface of the optical sheet 300. In addition, the light incident on one surface of the optical sheet 300 after being refracted and dispersed is refracted or dispersed again by the optical pattern formed in the optical sheet 300, and then, is refracted or dispersed again while emitting through the other surface of the optical sheet 300. Thus, the exit angle of the light emitting through the optical sheet 300 may be greater than the incident angle. Therefore, when the optical sheet 300 having the optical pattern formed therein is disposed above the light-emitting device 200, an effect of diffusing the light emitted from the light-emitting device 200 may be obtained and the light from the light-emitting device 200 that is a point light source may be easily implemented as a surface light source.

One surface of the optical sheet 300 disposed above the light-emitting device 200 may be in partial contact with the light-emitting surface of the light-emitting device 200. The light-emitting surface of at least one of the plurality of light-emitting devices 200 may be in contact with one surface of the optical sheet 300. Because the optical sheet 300 is formed as a sheet that is flexible, the optical sheet 300 may be bent or curved to some degree, and thus, a part of the surface of the optical sheet 300 may come into contact with the light-emitting surface of the light-emitting device 200. The optical sheet 300 may be disposed directly on the light-emitting devices 200, so that the light-emitting surfaces of the plurality of light-emitting devices 200 may entirely contact one surface of the optical sheet 300.

Part of the optical sheet 300, which is not in contact with the light-emitting surface of the light-emitting device 200, may be spaced apart from the upper surface of the substrate 100 by a distance d. Here, an interval h2 between one surface of the optical sheet 300 and the light-emitting surface of the light-emitting device 200 may be equal to or less than the half of a height h1 of the light-emitting device 200. Therefore, the distance d between one surface of the optical sheet 300 that is not in contact with the light-emitting surface of the light-emitting device 200 and the upper surface of the substrate 100 may be at most 1.5 times the height h1 of the light-emitting device 200.

The optical pattern formed in the optical sheet 300 may include shapes of figures such as hexagonal horns, cones, pyramids, etc. that are spaced apart from one another at constant intervals. However, the above example is an embodiment of the optical sheet, and the present disclosure is not limited thereto. That is, a shape, interval, and size of the optical pattern may be differently set by a designer. For example, the optical pattern formed in the optical sheet 300 may include conical shapes having uniform sizes arranged in a checkerboard type or arranged at different intervals, conical shapes having different sizes, or different features that are mixed and arranged.

The optical sheet 300 according to an embodiment of the present disclosure may have the optical pattern formed therein, and the optical pattern may have repeated pattern structure so that the light incident on one surface of the optical sheet 300 may be refracted and dispersed. Also, the repeated pattern structure may include one of a hexagonal shape, a conical shape, a pyramid shape, and an embossed shape, or may include a nano-lens pattern.

The repeated pattern structure of the optical pattern may include one figure, from among the hexagonal shape, the conical shape, the pyramid shape, and trapezoidal shape, protruding to the lower direction of the optical sheet 300 (direction to the surface on which the light is incident), an embossed pattern in which concave lenses are repeatedly arranged, or a nano-lens pattern in which nano-sized convex lenses are arranged. However, the present disclosure is not limited thereto, that is, the optical pattern capable of refracting or dispersing the incident light may be also applied as the optical pattern. The optical pattern may be formed on one surface of a base material by a photolithography process, a master mold process, a printing process, or other physical processing methods, and any of various pattern forming methods may be used to form the optical pattern.

Due to the light diffusion of the optical sheet 300 in which the repeated pattern structure of the optical pattern is formed, the backlight unit according to one or more embodiments of the present disclosure may emit the light from the light-emitting devices that are the point light sources as the surface light source, and may have uniform luminance.

An air gap may be formed between the substrate 100 and the optical sheet 300, and the light emitted from the light-emitting surface of the light-emitting device 200 may be refracted or dispersed through the air gap due to the difference in refractive index. In the diffused light, the light returning toward the substrate 100 may be re-reflected by the substrate 100 and then incident on the optical sheet 300. The air gap may be formed between the substrate 100 and the optical sheet 300, or may be formed between the upper surface of the light-emitting device 200 and the optical sheet 300 that is not in contact with the light-emitting device 200.

According to the backlight unit of the related art, an optical distance that is defined as a distance between optical members (diffusion plate, etc.) and the light-emitting device 200 has to be secured sufficiently in order to improve the effect of diffusing the light and emit the light of uniform luminance, and to this end, a support member has to be provided. In the backlight unit according to an embodiment of the present disclosure, the optical distance may be reduced to ½ of the light source thickness or less, the support member may not be used, and further, the optical distance may be extinguished because the optical sheet 300 may come into direct contact with the light-emitting device 200. A total thickness of the backlight unit may be reduced to a sum of thicknesses of the light-emitting device 200 and the optical sheets, for example, about 0.7 mm to about 2 mm. Therefore, according to an embodiment of the present disclosure, an ultra-slim backlight unit having reduced thickness may be provided, and the display apparatus including the backlight unit may be slim.

The backlight unit according to an embodiment of the present disclosure may further include the color conversion sheet 400 and the light conversion sheet 500 on the optical sheet 300. The color conversion sheet 400 may be in contact with the other surface of the optical sheet 300, and the light conversion sheet 500 may be arranged to be in contact with the color conversion sheet 400.

The color conversion sheet 400 may include a color conversion material that absorbs light of a certain wavelength band and emits light of a wavelength band different from that of absorbed light, so as to convert the color of incident light. In general, the light-emitting device 200 uses blue light-emitting diode (LED), and the color conversion sheet 400 may convert blue light into white light by using a color conversion material such as a fluorescent substance.

The light conversion sheet 500 may change an optical path of the incident light. The light conversion sheet 500 includes a light conversion material or has a pattern formed on one surface thereof so as to change the optical path of the incident light, and may adjust the luminance of emitted light or light uniformity of the emitted light according to the intention of the designer. For example, the light conversion sheet 500 may include a light conversion material and reduce a luminance deviation, etc. between a region of high light intensity and a region of low light intensity. The light conversion sheet 500 may include a diffusion sheet or a prism sheet, but is not limited thereto, and any optical path conversion sheet may be used provided that the optical path of the incident light may be changed.

Because the color conversion sheet 400 and the light conversion sheet 500 are disposed on the upper part of the optical sheet 300, the backlight unit according to an embodiment of the present disclosure may provide a surface light source having improved luminance and color uniformity and may noticeably reduce the total thickness of the backlight unit.

Figure 4:
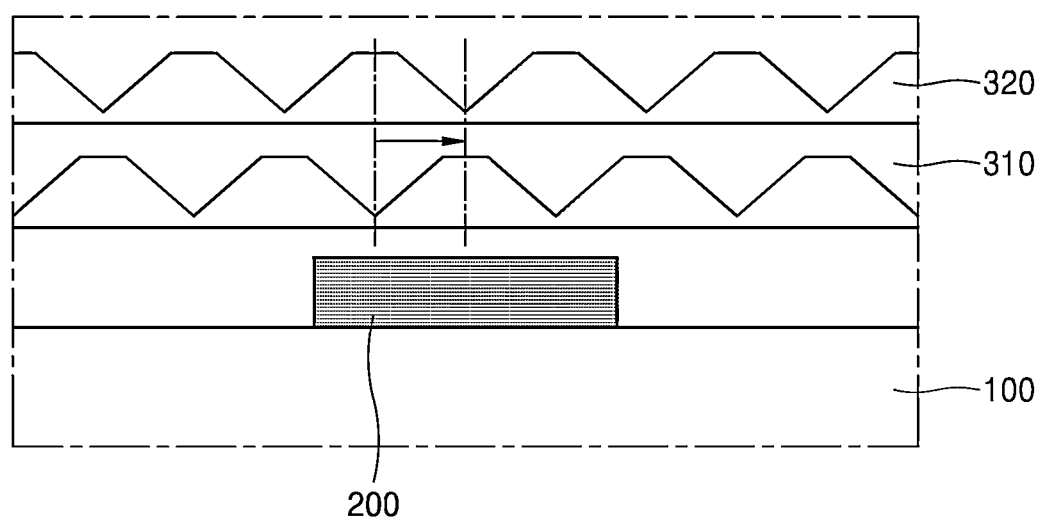
FIG. 4 is a cross-sectional view of a backlight unit according to an embodiment of the present disclosure, for describing a first optical sheet and a second optical sheet.

FIG. 4 is a cross-sectional view of a backlight unit according to an embodiment of the present disclosure, for describing a second optical sheet 320 disposed on a first optical sheet 310.

Referring to FIG. 4, the optical sheet 300 in the backlight unit according to an embodiment of the present disclosure may include a plurality of optical sheets 300. For example, the optical sheet 300 may include the first optical sheet 310 and the second optical sheet 320. When the backlight unit includes two optical sheets 300, the first optical sheet 310 may be disposed above the light-emitting device 200 and the second optical sheet 320 may be disposed on the first optical sheet 310. The first optical sheet 310 may be in contact with the light-emitting surface of the light-emitting device 200, and the second optical sheet 320 may be arranged adjacent to the first optical sheet 310 or may be in contact with the first optical sheet 310 without a gap therebetween. The first optical sheet 310 and the second optical sheet 320 may include the same material and may have an optical pattern formed therein. The optical patterns of the first optical sheet 310 and the second optical sheet 320 may be the same as each other, but are not limited thereto, that is, the optical patterns may be different from each other.

The second optical sheet 320 is disposed on the first optical sheet 310 and refracts and disperses the light emitted from the first optical sheet 310. Because the second optical sheet 320 is disposed on the first optical sheet 310, the light emitted from the light-emitting device 200 may be evenly dispersed.

The optical pattern of the second optical sheet 320 according to an embodiment of the present disclosure may be arranged so as not to overlap the optical pattern of the first optical sheet 310. For example, as shown in FIG. 4, when both the first optical sheet 310 and the second optical sheet 320 have the optical patterns of the conical shapes, the second optical sheet 320 may be arranged so that an apex of the conical shape in the second optical sheet 320 may be arranged between apexes of the conical shapes in the first optical sheet 310. Because the optical patterns of the first optical sheet 310 and the second optical sheet 320 above the light-emitting device 200 are arranged so that the optical patterns thereof do not overlap each other, the light emitted from the light-emitting device 200 may be more effectively dispersed and emitted and the surface light source may be easily implemented.

Figure 5:
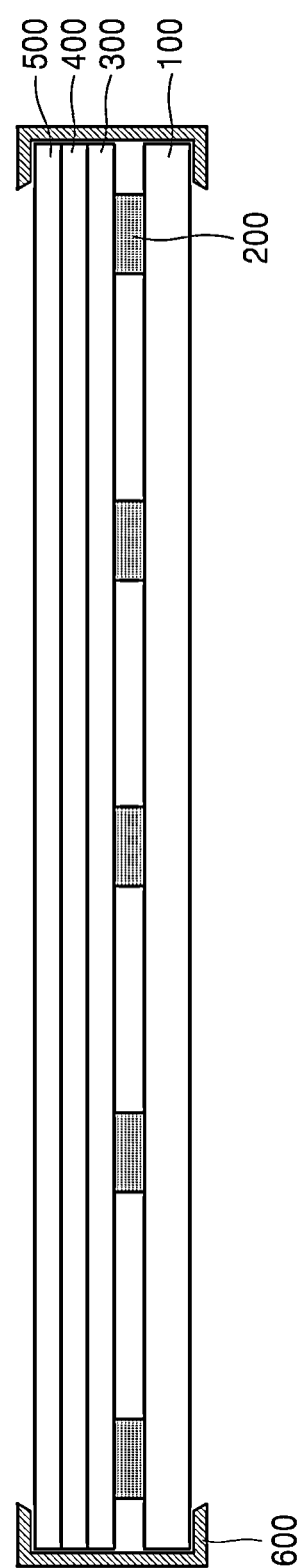
FIG. 5 is a cross-sectional view of a backlight unit according to an embodiment of the present disclosure.

FIG. 5 is a cross-sectional view of a backlight unit according to an embodiment of the present disclosure, and shows a schematic cross-section of the backlight unit further including a fixing unit 600 for fixing the optical sheet 300 to the upper portion of the substrate 100.

Referring to FIG. 5, the optical sheet 300 may be fixed along with the substrate 100 by the fixing unit 600, for example, the fixing unit 600 may be of a bracket type that couples the substrate 100 along with the optical sheet 300, the color conversion sheet 400, and the light conversion sheet 500, or a cover type that surrounds all the lower surface and the side surfaces of the substrate and the optical member. However, the fixing unit 600 is not limited thereto, and any type of fixing unit may be used provided that the optical sheet 300 may be fixed to the upper portion of the substrate 100.

For example, the optical sheet 300 may be attached and fixed to the light-emitting surface of at least one light-emitting device 200. In an embodiment, the optical sheet 300 may be attached to the light-emitting surface of the light-emitting device 200 directly by an adhesive unit. In another embodiment, the backlight unit may induce the optical sheet 300 so that one surface of the optical sheet 300 comes into contact with the light-emitting surface of the light-emitting device 200 by using the fixing unit 600 of FIG. 5.

Figure 6A:
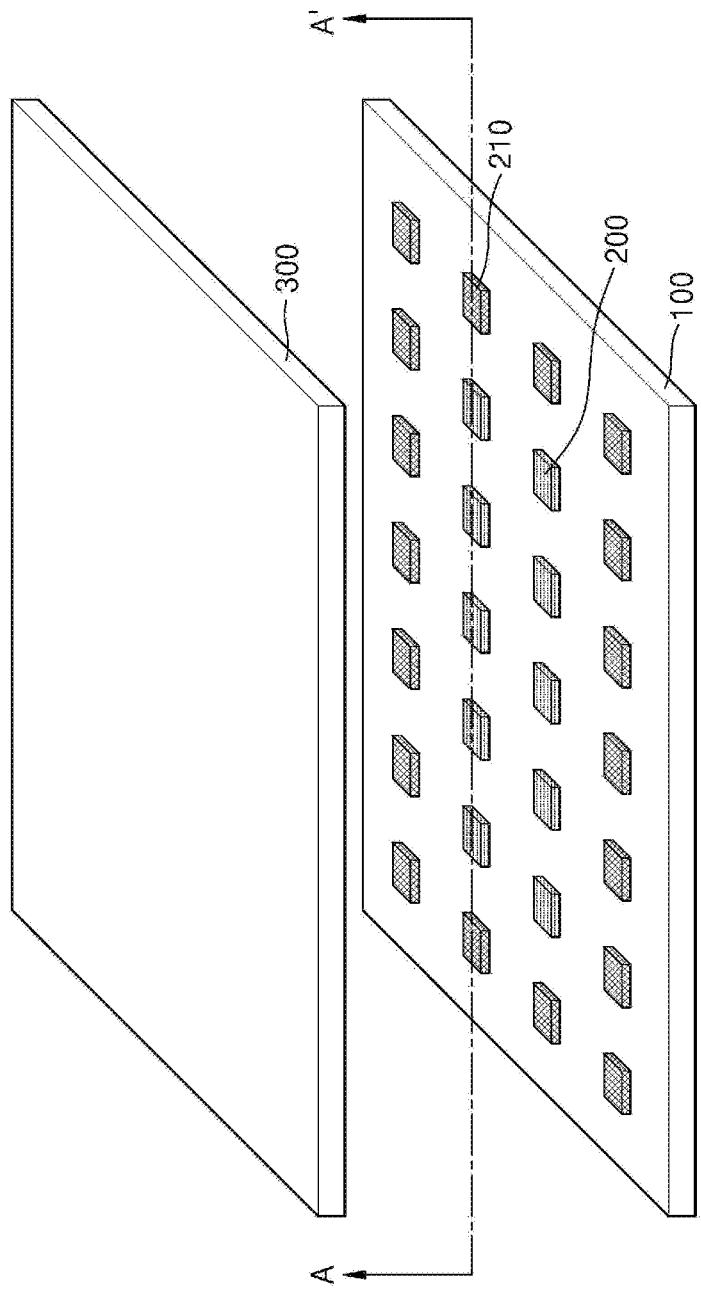
FIG. 6A is a diagram of a backlight unit according to an embodiment of the present disclosure.
Figure 6B:
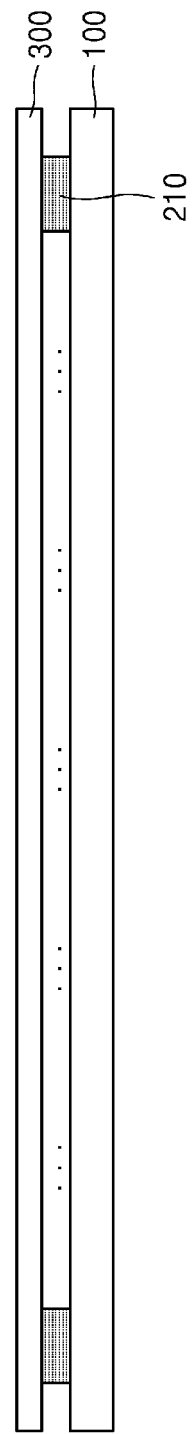
FIG. 6B is a cross-sectional view shown along line A-A' in assembled backlight unit of FIG. 6A.

FIG. 6A is a diagram of a backlight unit according to an embodiment, for describing an outermost light-emitting device 210. FIG. 6B is a cross-sectional view shown along line A-A' in assembled backlight unit of FIG. 6A.

Referring to FIGS. 6A and 6B, the light-emitting devices 200 may be arranged on the substrate 100 to be spaced apart from one another, and the optical sheet 300 may be arranged so that, from among the plurality of light-emitting devices 200 mounted on the substrate 100, the outermost light-emitting device 210 may at least partially come into contact with one surface of the optical sheet 300.

The light-emitting devices 200 may be arranged variously, e.g., in a checkerboard type arrangement, a concentric circle type arrangement, etc., and when the light-emitting surface of the outermost light-emitting device 210 comes into at least partial contact with one surface of the optical sheet 300, the surface of the optical sheet 300 may be entirely arranged adjacent to the light-emitting surface of the light-emitting device 200. Therefore, the light incident on one surface of the optical sheet 300 may be stably incident, and then, may be refracted and dispersed by the optical pattern formed in the optical sheet 300 and may be emitted through the other surface of the optical sheet 300.

Here, one surface of the optical sheet 300 may be fixedly attached to the light-emitting surface of the outermost light-emitting device 210 by using an adhesive unit. Alternatively, as shown in FIG. 5, one surface of the optical sheet 300 may be in contact with the light-emitting surface of the outermost light-emitting device 210 by using the fixing unit 600 (see FIG. 5).

FIG. 7 is a diagram showing results of performance tests for a backlight unit according to an embodiment of the present disclosure and a backlight unit according to the related art.

Referring to FIG. 7, pictures on upper side show results of an experiment using the backlight unit according to a comparative example, in which a diffusion plate is applied on the light source without forming an optical distance, and the color conversion sheet 400 and the light conversion sheet 500 are additionally applied on the diffusion plate, and pictures on the lower side show the experiment results when the optical sheet 300 according to an embodiment of the present disclosure is applied.

In the backlight unit according to the comparative example, the diffusion plate is used and the color conversion sheet 400 is applied, and as a result, a hot spot having a large light intensity generates above the light source and uneven luminance is shown as compared with the portion where the light source is not located.

On the contrary, when the optical sheet 300 according to an embodiment of the present disclosure is applied, the light from the light source is evenly diffused even though the optical sheet 300 is arranged to have the optical distance close to 0, and thus, output of uniform luminance may be obtained.

Therefore, according to the backlight unit of the embodiment of the present disclosure, the optical sheet 300 or the first optical sheet 310 and the second optical sheet 320 may effectively diffuse the light emitted from the light-emitting device 200, and thus, the optical distance may be reduced and the total thickness of the backlight unit may be reduced. In addition, unnecessary optical elements such as an optical lens, a support member, etc. may be deleted to facilitate the implementation of flexible displays, and moreover, because the light may be effectively diffused, an interval between the light-emitting devices 200 on the substrate 100 may be increased, to thereby reduce the manufacturing costs.

While the disclosure has been particularly shown and described with reference to exemplary embodiments thereof, it will be understood by those of ordinary skill in the art that various changes in form and details may be made therein without departing from the spirit and scope as defined by the following claims. Therefore, the scope sought to be protected of the disclosure shall be defined by the appended claims.

According to the backlight unit of the embodiments of the present disclosure, the luminance characteristic and color uniformity may be improved without using the diffusion plate and the optical lens, and the optical distance is reduced to decrease the total thickness of the backlight unit. Therefore, an ultra-slim backlight unit may be implemented.

Also, the backlight unit according to the embodiments of the present disclosure do not apply the diffusion plate and the optical lens, and thus, the backlight unit may be effectively used to implement the flexible display. Accordingly, costs for manufacturing the optical lens, etc. may be reduced, and thus, manufacturing costs may be reduced.

Also, the backlight unit according to the embodiments of the present disclosure may implement a surface light source by evenly diffusing the light while minimizing luminance loss of the light emitted from the light source. In addition, the interval of arranging the light sources may be increased so that the surface light source may be implemented by using less number of light sources, and thus, costs for the light source may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A backlight unit comprising:
a substrate;
a plurality of light-emitting devices mounted on the substrate;
a first optical sheet disposed above the light-emitting devices and comprising a first optical pattern formed therein; and
a second optical sheet disposed on the first optical sheet and comprising a second optical pattern formed therein,
wherein the first optical sheet is in contact with a light-emitting surface of at least one light-emitting device via one surface thereof, and emits light of the light-emitting device incident on the one surface thereof to the other surface facing the one surface, while refracting or dispersing the light in a direction different from a direction in which the light is incident due to the first optical pattern formed therein, and
wherein the first optical pattern of the first optical sheet and the second optical pattern of the second optical sheet are arranged so as not to overlap each other.

2. The backlight unit of claim 1, wherein the first optical sheet has the first optical pattern formed between the one surface and the other surface thereof such that an exit angle of the light emitted through the other side is greater than an incident angle of the light incident on the one surface.

3. The backlight unit of claim 1, wherein a distance between an upper surface of the substrate and a part of the one surface of the first optical sheet, which is not in contact with the light-emitting surface of the light-emitting device, is at most 1.5 times a height of the light-emitting device.

4. The backlight unit of claim 1, further comprising a color conversion sheet that is in contact with the other surface of the first optical sheet, and a light conversion sheet that is in contact with the color conversion sheet.

5. The backlight unit of claim 1, wherein the first optical sheet is fixed to an upper portion of the substrate.

6. The backlight unit of claim 1, wherein the first optical pattern formed in the first optical sheet has a repeated pattern structure so as to refract and disperse the light incident on the one surface of the first optical sheet.

7. The backlight unit of claim 6, wherein the pattern structure includes one of a hexagonal shape, a conical shape, a pyramid shape, and a trapezoidal shape.

8. The backlight unit of claim 1, wherein the first optical pattern and the second optical pattern are the same.

9. The backlight unit of claim 1, wherein the first optical pattern and the second optical pattern are different from each other.

10. A backlight unit comprising:
a substrate;
a plurality of light-emitting devices mounted on the substrate;
a first optical sheet disposed above the light-emitting devices and comprising a first optical pattern formed therein; and
a second optical sheet disposed on the first optical sheet and comprising a second optical pattern formed therein,
wherein the light-emitting devices are disposed on the substrate to be spaced apart from one another, and one surface of the first optical sheet is at least partially in contact with a light-emitting surface of an outermost light-emitting device, from among the plurality of light-emitting devices, and the first optical sheet emits light from the light-emitting device incident on the one surface to the other surface facing the one surface while refracting or dispersing the light in a direction different from a direction in which the light is incident due to the first optical pattern formed therein,
wherein the first optical pattern of the first optical sheet and the second optical pattern of the second optical sheet are arranged so as not to overlap each other.

11. The backlight unit of claim 10, wherein the first optical sheet has the first optical pattern formed between the one surface and the other surface thereof such that an exit angle of the light emitted through the other side is greater than an incident angle of the light incident on the one surface.

12. The backlight unit of claim 10, wherein a distance between an upper surface of the substrate and a part of the one surface of the first optical sheet, which is not in contact with the light-emitting surface of the light-emitting device, is at most 1.5 times a height of the light-emitting device.

13. The backlight unit of claim 10, further comprising a color conversion sheet that is in contact with the other surface of the first optical sheet, and a light conversion sheet that is in contact with the color conversion sheet.

14. The backlight unit of claim 10, wherein the first optical sheet is fixed to an upper portion of the substrate.

15. The backlight unit of claim 10, wherein the optical pattern formed in the first optical sheet has a repeated pattern structure so as to refract and disperse the light incident on one surface of the first optical sheet.

16. The backlight unit of claim 15, wherein the pattern structure includes one of a hexagonal shape, a conical shape, a pyramid shape, and a trapezoidal shape.

17. The backlight unit of claim 10, wherein the first optical pattern and the second optical pattern are the same.

18. The backlight unit of claim 10, wherein the first optical pattern and the second optical pattern are different from each other.

* * * * *